(12) United States Patent
Sasaki et al.

(10) Patent No.: US 8,991,035 B2
(45) Date of Patent: Mar. 31, 2015

(54) METHOD OF MANUFACTURING LAMINATED CORE

(75) Inventors: Hidemi Sasaki, Fukuoka (JP); Masayuki Okabe, Fukuoka (JP)

(73) Assignee: Mitsui High-Tec, Inc., Kitakyushu-shi (JP)

(*) Notice: Subject to any disclaimer, the term of this patent is extended or adjusted under 35 U.S.C. 154(b) by 213 days.

(21) Appl. No.: 13/528,229

(22) Filed: Jun. 20, 2012

(65) Prior Publication Data

US 2012/0324719 A1    Dec. 27, 2012

(30) Foreign Application Priority Data

Jun. 23, 2011    (JP) ................. 2011-139741

(51) Int. Cl.
| | |
|---|---|
| *H02K 15/02* | (2006.01) |
| *B29C 45/14* | (2006.01) |
| *B29C 39/10* | (2006.01) |
| *B29C 45/02* | (2006.01) |
| *H02K 15/03* | (2006.01) |
| *H02K 15/12* | (2006.01) |
| *B29L 31/34* | (2006.01) |
| *B29K 105/20* | (2006.01) |

(52) U.S. Cl.
CPC ..... *B29C 45/14065* (2013.01); *B29C 45/14639* (2013.01); *B29C 39/10* (2013.01); *B29C 45/02* (2013.01); *H02K 15/03* (2013.01); *H02K 15/12* (2013.01); *B29K 2995/0008* (2013.01); *B29L 2031/34* (2013.01); *B29K 2105/203* (2013.01)
USPC ........................ 29/598; 29/596; 310/216.004

(58) Field of Classification Search
CPC ............................ H02K 15/02; H02K 1/246
USPC ........ 29/596–598, 605–606, 732; 310/43, 71, 310/68 B, 216.004
See application file for complete search history.

(56) References Cited

U.S. PATENT DOCUMENTS

| | | | | |
|---|---|---|---|---|
| 4,312,119 A | * | 1/1982 | Perucchi et al. | 29/596 |
| 4,315,173 A | * | 2/1982 | Calfo et al. | 310/53 |
| 4,614,022 A | * | 9/1986 | Bibby et al. | 29/596 |
| 5,859,486 A | * | 1/1999 | Nakahara et al. | 310/216.004 |
| 5,893,205 A | * | 4/1999 | McClelland | 29/598 |
| 6,167,610 B1 | * | 1/2001 | Nakahara et al. | 29/596 |
| 2012/0324719 A1 | * | 12/2012 | Sasaki et al. | 29/598 |

FOREIGN PATENT DOCUMENTS

| | | |
|---|---|---|
| CN | 101356711 A | 1/2009 |
| JP | 2002-034187 A | 1/2002 |

(Continued)

OTHER PUBLICATIONS

Office Action dated Mar. 14, 2014, issued in Chinese Patent Application No. 201210208937.9 (2 pages).

*Primary Examiner* — Minh Trinh

(74) *Attorney, Agent, or Firm* — Westerman, Hattori, Daniels & Adrian, LLP

(57) ABSTRACT

A method of manufacturing a laminated core includes: preheating a rotor core body; attaching a cull plate onto a surface of the body removed from a preheating device; placing the body in a resin-sealing mold; heating and liquefying resin in resin reservoir pots by the mold; extruding the liquefied resin into plural magnet insertion holes and curing the resin; and ejecting a laminated rotor core from the mold and detaching the plate, wherein attaching the plate and detaching the plate are performed at a same station, and the plate detached is used as the plate at the attaching of the cull plate.

6 Claims, 4 Drawing Sheets

(56) References Cited

FOREIGN PATENT DOCUMENTS

| JP | 2008-054376 A | 3/2008 |
| JP | 4414417 B2 | 2/2010 |
| JP | 2010-158164 A | 7/2010 |

\* cited by examiner

METHOD OF MANUFACTURING LAMINATED CORE

TECHNICAL FIELD

The present invention relates to a method of manufacturing a laminated core, the method comprising inserting permanent magnets (including pre-magnetized ones) into plural magnet insertion holes and resin-sealing the permanent magnets.

BACKGROUND ART

In manufacturing of laminated cores, for example, Patent Literature 1 discloses a technique that permanent magnets are inserted respectively in plural magnet insertion holes of a rotor core body (i.e., a laminated core with no permanent magnet sealed inside) and then are resin-sealed. However, in the technique of Patent Literature 1, after resin-sealing to the laminated core is completed, it is time-consuming and troublesome to remove resin from a mold. Thus, the technique of Patent Literature 1 is not suitable for mass production.

To overcome the above problem, Patent Literature 2 discloses a technique (commonly known as a magnet molding) that a preheated rotor core body with permanent magnets inserted in magnet insertion holes is clamped between an upper mold and a lower mold, and liquefied resin is extruded from resin reservoir pots formed vertically through the upper mold, thereby being filled into the magnet insertion holes. This technique allows easy removal of eventually unnecessary cull (resin residue), remarkably increasing production efficiency.

Furthermore, Patent Literature 3 discloses a technique that a dummy plate (hereinafter called as "cull plate") is placed on an upper part of a rotor core body, resin is injected through the cull plate, and the cull plate is removed after the resin filled in magnet insertion holes is cured. This technique enables easier removal of resin remained and cured on an upper part of a laminated core.

SUMMARY OF INVENTION

Technical Problem

However, in a case where a number of laminated cores are continuously manufactured, preheating a rotor core body (i.e., with no permanent magnet inserted therein) takes more time compared with injecting resin into the rotor core body using a molding apparatus having upper and lower molds. Thus, it is necessary to prepare preheated rotor core bodies beforehand. Furthermore, in a case where resin-sealing is performed using the cull plate, the cull plate is preferably used repeatedly. In such a case, it is preferable that the cull plate is detached from a finished laminated core, cleaned, and attached again onto a rotor core body to be subjected to resin-sealing.

The present invention has been made in view of the above. The object of the present invention is to provide a method of manufacturing a laminated core, which allows repeated use of the cull plate while harmonizing the time required for preheating the rotor core body with the time required for resin-sealing, thereby enabling efficient resin-sealing of permanent magnets to the rotor core body.

Solution to Problem

To achieve the above object, a method of manufacturing a laminated core according to the present invention includes: a first step of placing and preheating a rotor core body in a preheating device, the rotor core body being formed by laminating plural core sheets and being provided with plural magnet insertion holes inserted or to be inserted with permanent magnets; a second step of attaching a cull plate onto a surface of the rotor core body ejected from the preheating device; a third step of placing the rotor core body attached with the cull plate in a resin-sealing mold; a fourth step of pressing the rotor core body by the resin-sealing mold and liquefying resin in plural resin reservoir pots formed in the resin-sealing mold by heating; a fifth step of extruding the liquefied resin out of the resin reservoir pots, thereby filing the resin into the plural magnet insertion holes, and then curing the resin; and a sixth step of removing a laminated rotor core finished with resin-sealing from the resin-sealing mold and detaching the cull plate, wherein the second step of attaching the cull plate and the sixth step of detaching the cull plate from the laminated rotor core are performed at a same station, and further wherein the cull plate detached at the sixth step is used as the cull plate at the second step.

In the present invention, the cull plate detached from the laminated rotor core at the sixth step can be cleaned, and subsequently is attached, as the cull plate used at the second step, onto the surface of the rotor core body that has been preheated at the first step.

In the present invention, the permanent magnets can be inserted into the magnet insertion holes of the rotor core body that has been preheated.

In the present invention, as to a first laminated core processed at the start-up of a device, the cull plate may be attached onto the surface of the rotor core body not preheated and having the permanent magnets inserted therein, and the cull plate may be preheated together with the rotor core body.

Advantageous Effects of Invention

The method of manufacturing a laminated core using the cull plate (i.e., using magnet molding) according to the present invention has the following effects.

(1) The method of manufacturing a laminated core of the present invention enables mass production of the laminated cores.

(2) The cull plate can be attached to and detached from the rotor core body by a single device (i.e., at one station), which realizes downsizing of the manufacturing facility.

(3) Since the cull plate is cleaned immediately after being detached from the laminated rotor core finished with resin-sealing and then is attached onto the surface of a subsequent rotor core body, a small number of the cull plates can be repeatedly used, thereby eliminating the need for preparing a large number of the cull plates.

(4) Since the attachment of the cull plate to the rotor core body, resin-sealing, detachment of the cull plate, cleaning of the cull plate, and attachment of the cull plate to the subsequent rotor core body are continuously performed, decrease in temperature of the cull plate due to natural cooling is small. Therefore, after the cull plate is attached to the subsequent rotor core body, the temperature of the cull plate can be elevated to that of the rotor core body in a short time. Because of this, preheating of the cull plate becomes unnecessary.

DESCRIPTION OF EMBODIMENT

Figure 2A:
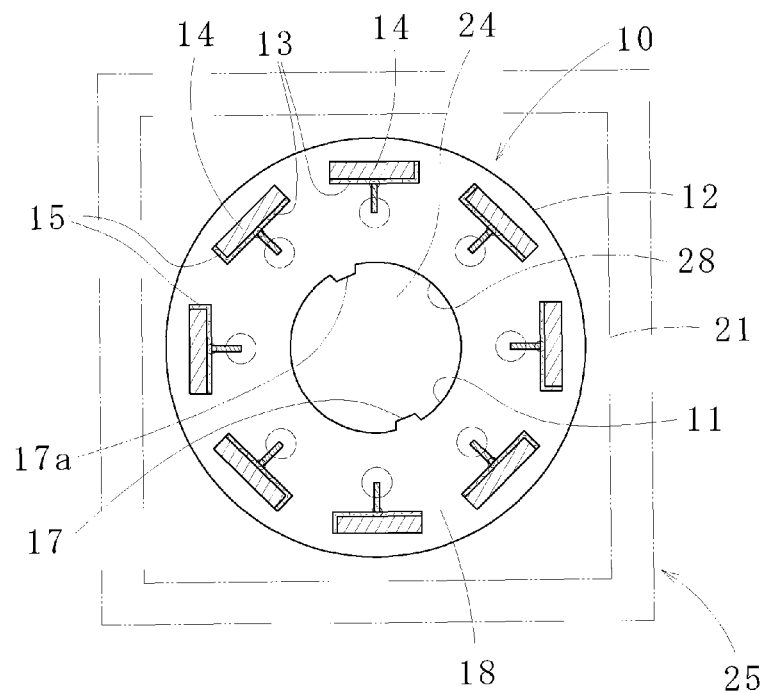
FIGS. 2(A) and 2(B) are a plan view and a front view of a laminated core resin-sealed by the method of manufacturing the laminated core, respectively.
Figure 2B:
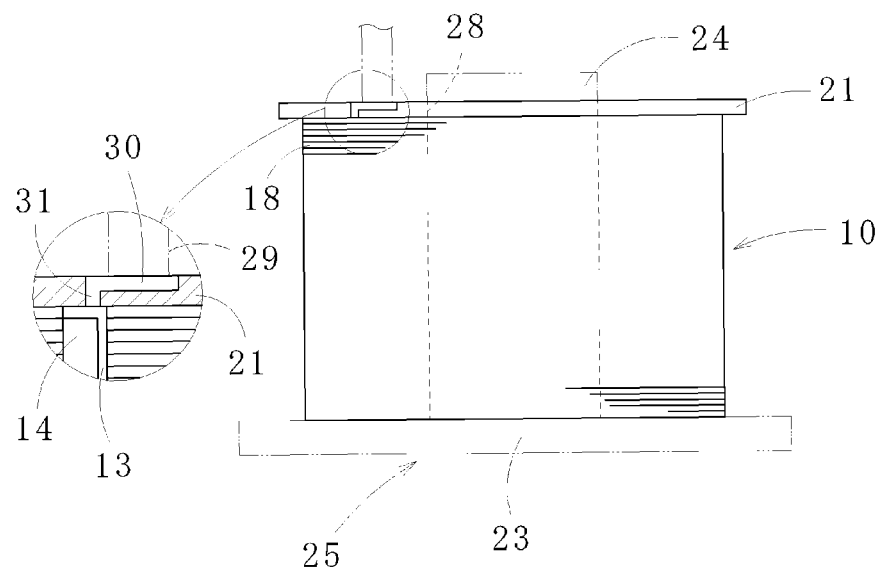

An embodiment of the present invention will be described with reference to the accompanying drawings. As illustrated in FIGS. 2(A) and 2(B), a laminated rotor core 10, using a method of manufacturing a laminated core according to one embodiment of the present invention, includes plural magnet insertion holes 13 at a radially outward area of a rotor core body 12 having a shaft hole 11 formed at a center thereof. In each of the magnet insertion holes 13, a permanent magnet 14 is inserted and resin-sealed with resin (thermosetting resin) 15. The shaft hole 11 includes a key (convex line) 17 protruding inward thereof so that positions (i.e., angles) of the magnet insertion holes 13 formed on the rotor core body 12 can be identified.

Figure 3:
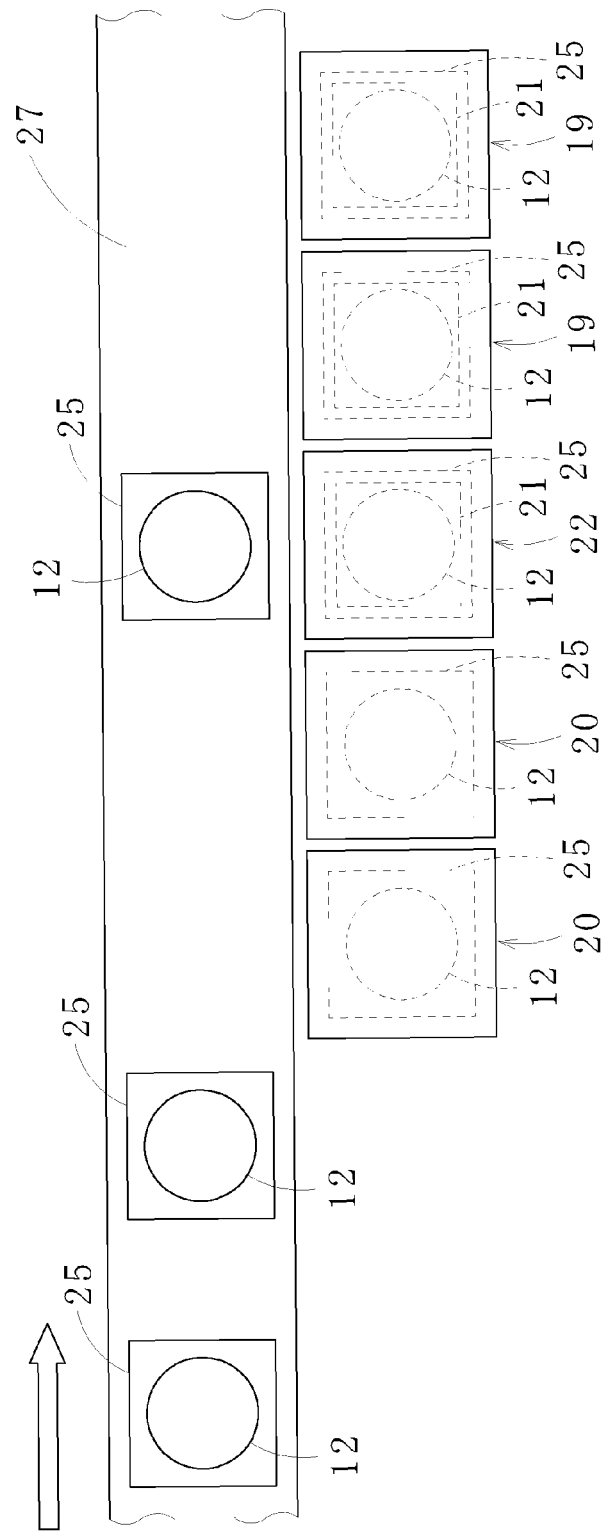
FIG. 3 is a schematic plan view of a manufacturing device to which the method of manufacturing the laminated core is applied.

The method of manufacturing this laminated core, as shown in FIGS. 2(A), 2(B), and 3, comprises a first step of placing and preheating the rotor core body 12 in a preheating device 20, the rotor core body 12 formed by laminating and caulking plural core sheets 18 and provided with the plural magnet insertion holes 13 in which the permanent magnets 14 are inserted; a second step of attaching a cull plate 21 onto a surface of the rotor core body 12 ejected from the preheating device 20; a third step of placing the rotor core body 12 attached with the cull plate 21 in a resin-sealing mold 19 comprising an upper mold and a lower mold; a fourth step of pressing the rotor core body 12 by the resin-sealing mold 19 and liquefying the resin 15 in plural resin reservoir pots 29 formed in the upper mold of the resin-sealing mold 19 by heating; a fifth step of extruding the liquefied resin 15 out of the resin reservoir pots 29, thereby filling the resin 15 into the plural magnet insertion holes 13, and then curing the resin 15; and a sixth step of removing the laminated rotor core 10 from the resin-sealing mold 19.

The second step of attaching the cull plate 21 and the sixth step of detaching the cull plate 21 from the resin-sealed laminated rotor core 10 are performed at a same station 22. The cull plate 21 detached at the sixth step is used as the cull plate 21 at the second step. Each rotor core body 12 is placed on a carrier jig 25 having a bedplate 23 and a shaft 24, and then conveyed. Hereunder, a detail description will be given thereon. The technique of resin-sealing the permanent magnets 14 in the magnet insertion holes 13 of the rotor core body 12 has been disclosed in Patent Literature 3 and has been publicly known, thus a detailed description thereof will be omitted.

The core sheets 18 of a predetermined shape are formed by blanking using a press machine (not illustrated), and are laminated and caulked in a die, thereby forming the rotor core body 12. Into the magnet insertion holes 13 of this rotor core body 12, the permanent magnets (in a non-excited or weakly excited state) 14 are inserted. Then, as illustrated in FIG. 3, the rotor core body 12 is placed on the carrier jig 25 and conveyed by a conveyor (conveying means) 27, and then is carried into the preheating device 20. In the preheating device 20, the rotor core body 12 is heated to around 160-180° C. with a heated gas or by a heater. Since preheating of the rotor core body 12 takes time, plural heating devices 20 are provided to successively preheat the rotor core bodies 12.

The preheated rotor core body 12 is conveyed to the station 22 where attachment and detachment of the cull plate 21 are performed. Here, the cull plate 21 is fitted on the rotor core body 12. At a center of the cull plate 21, a through hole 28 same as the shaft hole 11 of the rotor core body 12 is formed. The shaft 24 of the carrier jig 25 has a key groove which corresponds to the key 17 formed on the shaft hole 11 of the rotor core body 12. Accordingly, by fitting a key 17a formed on the through hole 28 of the cull plate 21 into the key groove, positions of the resin reservoir pots 29 formed in the upper mold, resin passages 30 formed on the cull plate 21, resin injection holes 31, and the magnet insertion holes 13 of the rotor core body 12 can be coincided (aligned). In this embodiment, the resin passages 30 are provided to the cull plate 21, however, the resin passages 30 may be formed on the upper mold. Alternatively, without forming the resin passages 30, the resin 15 may be injected from the resin reservoir pots 29 directly into the resin injection holes 31.

The cull plate 21 has a size larger than an outer diameter of the rotor core body 12, and a periphery thereof extends outside of the rotor core body 12. This configuration allows the cull plate 21 to be easily attached onto or detached from the rotor core body 12 by a U-shaped lifting arm (not illustrated) or a gripping means (not illustrated). Furthermore, in this embodiment, the cull plate 21 has a square shape in a plan view, however, the cull plate 21 may have a circular shape or a rectangular shape.

Figure 1:
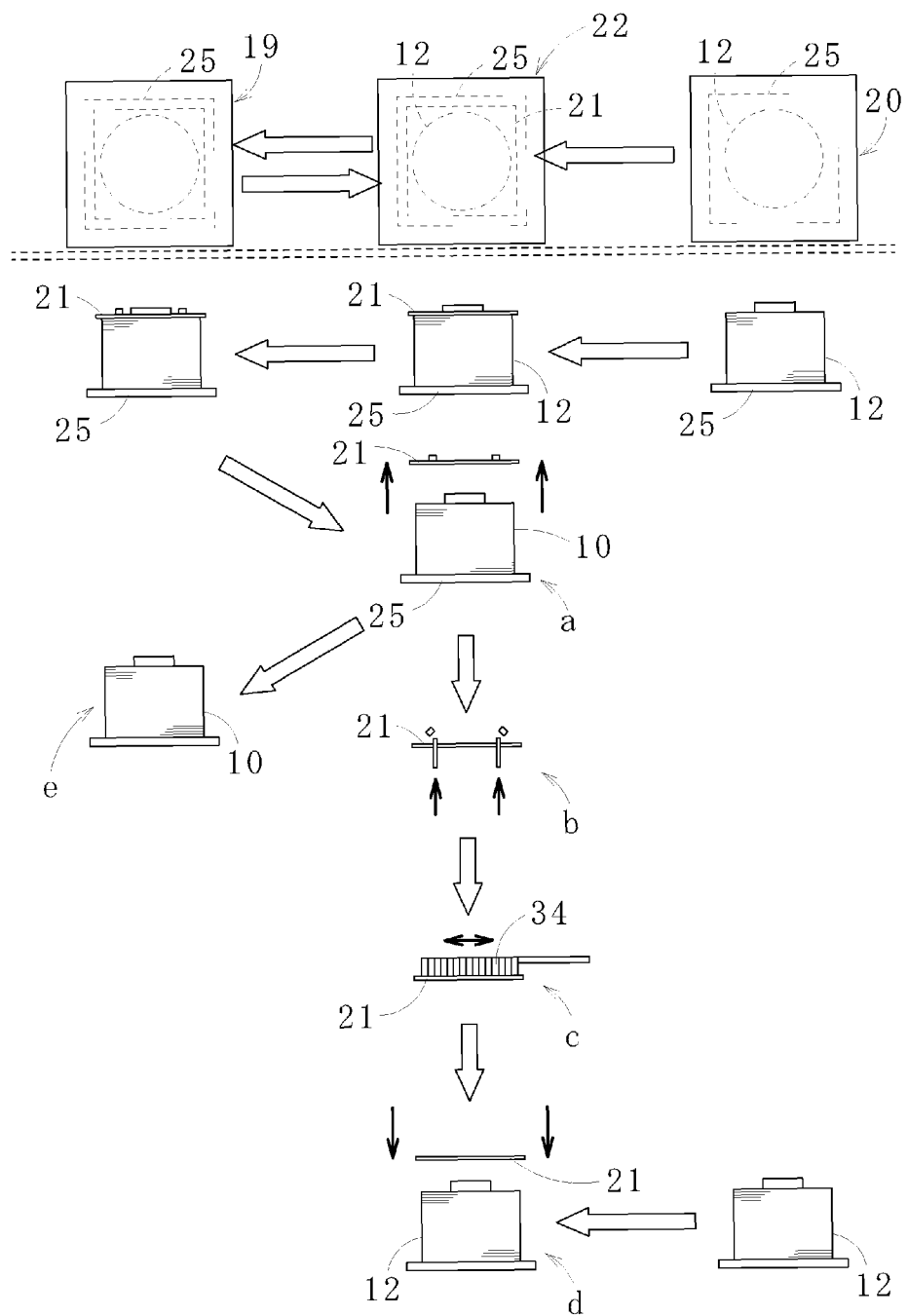
FIG. 1 is an explanatory diagram illustrating a method of manufacturing a laminated core according to one embodiment of the present invention.

The rotor core body 12 fitted with the cull plate 21 at the station 22, as shown in FIG. 1, is conveyed into the resin-sealing mold 19. While the rotor core body 12 is placed (clamped) between the upper and lower molds, resin-sealing is performed on the magnet insertion holes 13. The lower mold of the resin-sealing mold 19 has a positioning pin, which corresponds to the bedplate 23 of the carrier jig 25. The positioning pin allows positioning of the rotor core body 12 and the resin-sealing mold 19. The laminated rotor core 10 finished with resin-sealing by the resin-sealing mold 19 is returned to the station 22 by the conveyor 27, and the cull plate 21 is detached from the laminated rotor core 10 by the U-shaped lifting arm or the gripping means.

The resin (cull) is solidified in the resin reservoir pots 29 of the upper mold, the resin passages 30, and the resin injection holes 31, and is adhered on the cull plate 21 (shown by arrow "a" in FIG. 1). The adhered resin is removed by inserting rods into the resin injection holes 31 formed in the cull plate 21 (see arrow "b" in FIG. 1). The surface (and a bottom surface if necessary) of the cull plate 21 is cleaned with a brush 34 (see arrow "c" in FIG. 1). Then, the cull plate 21 finished with cleaning by these procedures is preheated again and fitted on the rotor core body 12 to be subsequently subjected to resin-sealing (See arrow "d" in FIG. 1). The laminated rotor core 10 removed of the cull plate 21 is conveyed to a cooling step (see arrow "e" in FIG. 1).

Figure 4:
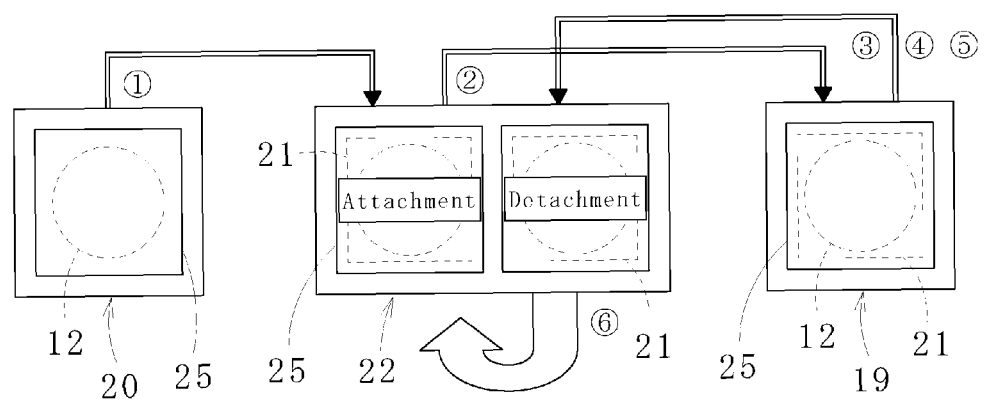
FIG. 4 is an explanatory diagram illustrating the method of manufacturing the laminated core.

In other words, in this embodiment, as illustrated in FIGS. 3 and 4, the rotor core body 12 that has been preheated to a predetermined temperature by the preheating device 20 is fitted with the cull plate 21 at the station 22, and the permanent magnets 14 are resin-sealed in the magnet insertion holes 13 by the resin-sealing mold 19. The rotor core body 12 is conveyed again to the station 22 and the cull plate 21 is detached. At this position, the cull plate 21 is removed of the cull and is cleaned. Then, the cull plate 21 is attached onto the rotor core body 12 that has been preheated and is to be subsequently subjected to resin-sealing.

With the above-described configuration, the cull plate 21 can be used repeatedly, and thus only a small number of the cull plates 21 is required. Moreover, repeated use of the cull plate 21 leads to an advantage that decrease in temperature of the cull plate 21 is small. Furthermore, in this embodiment, all the treatments are performed using the carrier jig 25, which allows easy conveyance and positioning of the rotor core body 12 and the laminated rotor core 10.

The present invention is not limited to the embodiment described above, and various embodiments and modifications can be made without departing from the scope of the present invention. For example, the present invention can be applied to a case where the resin is filled simultaneously into plural (e.g., two) magnet insertion holes from a single resin reservoir pot.

In addition, in the above embodiment, the respective core sheets 18 are circular-disc shaped, however, the present invention can be applied to a wound core formed by bending a strip-shaped core sheet.

Furthermore, before insertion of the permanent magnets, the rotor core body may be preheated, and subsequently, preheated (or non-preheated) permanent magnets may be inserted.

REFERENCE SIGNS LIST

10: laminated rotor core, 11: shaft hole, 12: rotor core body, 13: magnet insertion hole, 14: permanent magnet, 15: resin, 17 and 17a: key, 18: core sheet, 19: resin-sealing mold, 20: preheating device, 21: cull plate, 22: station, 23: bedplate, 24: shaft, 25: carrier jig, 27: conveyor, 28: through hole, 29: resin reservoir pot, 30: resin passage, 31: resin injection hole, 34: brush

The invention claimed is:

1. A method of manufacturing a laminated core comprising:
    a first step of placing and preheating a rotor core body in a preheating device, the rotor core body being formed by laminating plural core sheets and being provided with plural magnet insertion holes inserted with permanent magnets;
    a second step of attaching a cull plate onto a surface of the rotor core body ejected from the preheating device;
    a third step of placing the rotor core body attached with the cull plate in a resin-sealing mold;
    a fourth step of pressing the rotor core body by the resin-sealing mold and liquefying resin by heating in plural resin reservoir pots formed in the resin-sealing mold;
    a fifth step of extruding the liquefied resin out of the resin reservoir pots, thereby filing the resin into the plural magnet insertion holes, and then curing the resin; and
    a sixth step of ejecting a laminated rotor core finished with resin-sealing from the resin-sealing mold and detaching the cull plate, wherein
    the second step of attaching the cull plate and the sixth step of detaching the cull plate from the laminated rotor core are performed at a same station, and further wherein
    the cull plate detached at the sixth step is used as the cull plate at the second step.

2. The method of manufacturing the laminated core as defined in claim 1, wherein the cull plate detached from the laminated rotor core at the sixth step is cleaned, and subsequently is attached, as the cull plate used at the second step, onto the surface of the rotor core body that has been preheated at the first step.

3. A method of manufacturing a laminated core comprising:
    a first step of placing and preheating a rotor core body in a preheating device, the rotor core body being formed by laminating plural core sheets and being provided with plural magnet insertion holes to be inserted with permanent magnets;
    a second step of attaching a cull plate onto a surface of the rotor core body ejected from the preheating device;
    a third step of placing the rotor core body attached with the cull plate in a resin-sealing mold;
    a fourth step of pressing the rotor core body by the resin-sealing mold and liquefying resin by heating in plural resin reservoir pots formed in the resin-sealing mold;
    a fifth step of extruding the liquefied resin out of the resin reservoir pots, thereby filing the resin into the plural magnet insertion holes, and then curing the resin; and
    a sixth step of ejecting a laminated rotor core finished with resin-sealing from the resin-sealing mold and detaching the cull plate, wherein
    the second step of attaching the cull plate and the sixth step of detaching the cull plate from the laminated rotor core are performed at a same station, and further wherein
    the cull plate detached at the sixth step is used as the cull plate at the second step.

4. The method of manufacturing the laminated core as defined in claim 3, wherein the cull plate detached from the laminated rotor core at the sixth step is cleaned, and subsequently is attached, as the cull plate used at the second step, onto the surface of the rotor core body that has been preheated at the first step.

5. The method of manufacturing the laminated core as defined in claim 4, wherein the permanent magnets are inserted into the magnet insertion holes of the rotor core body that has been preheated.

6. The method of manufacturing the laminated core as defined in claim 3, wherein the permanent magnets are inserted into the magnet insertion holes of the rotor core body that has been preheated.

* * * * *